Oct. 9, 1956  J. A. CAMPBELL  2,765,870
APPARATUS FOR SEPARATION OF ENTRAINED LIQUID FROM GASES
Filed May 16, 1955  2 Sheets-Sheet 1

Julian A. Campbell,
INVENTOR.

By H. Calvin White
ATTORNEY.

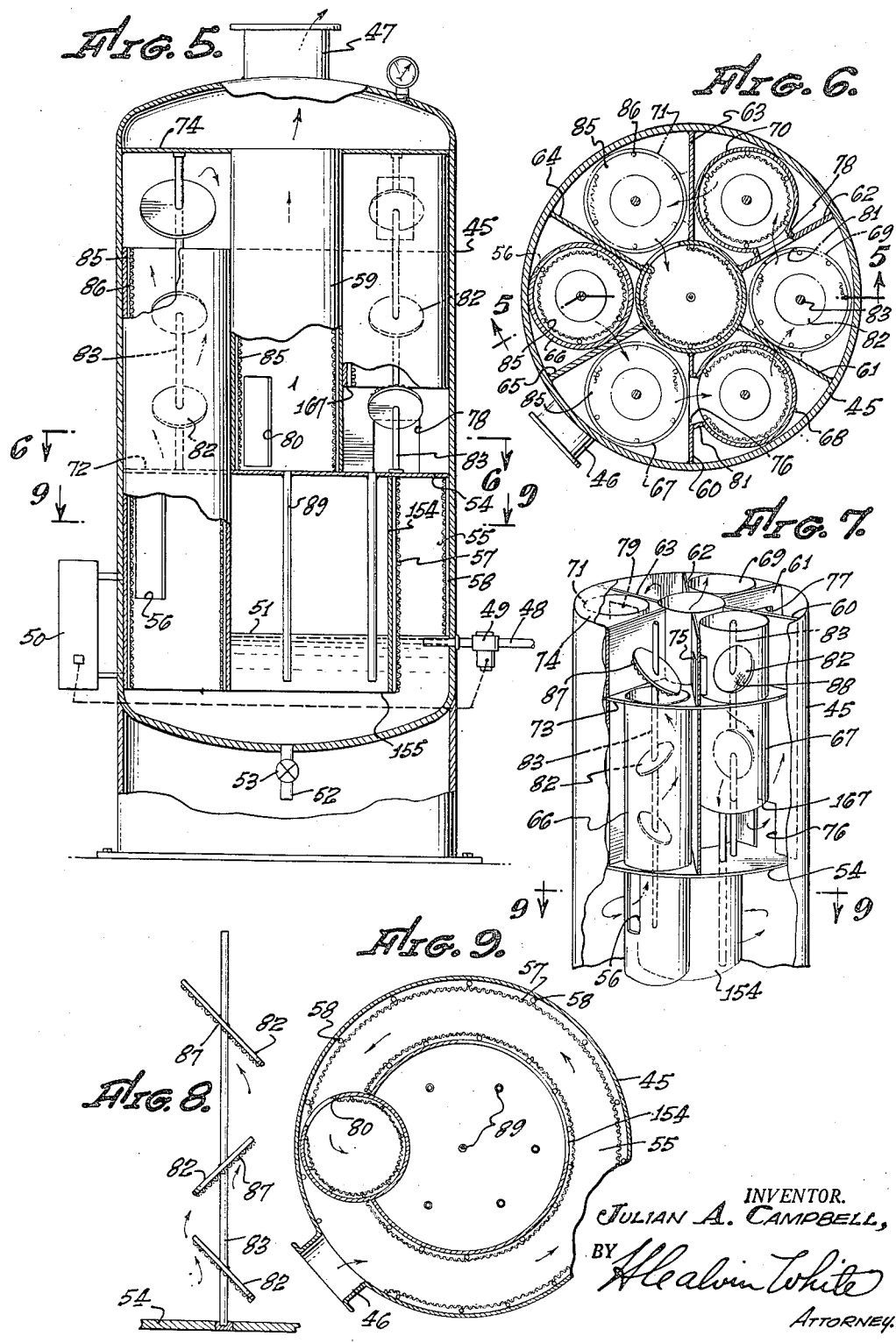

United States Patent Office 2,765,870
Patented Oct. 9, 1956

2,765,870

APPARATUS FOR SEPARATION OF ENTRAINED LIQUID FROM GASES

Julian A. Campbell, Long Beach, Calif.

Application May 16, 1955, Serial No. 508,695

20 Claims. (Cl. 183—81)

This invention relates to improved separators having general utility for removing liquids from gas streams, and as typical, for separating entrained oil particles from natural or refinery gases.

In the past there have been developed different types of gas and liquid separators, some of which have been capable of removing a very high percentage of the entrained liquid from a gas, sometimes in excess of 99%. However, no prior separator of which I am aware has been able to remove the very last traces of liquid and render the separation substantially complete. In all cases, there has remained entrained in the gases a substantial amount of extremely finely divided liquid, which has been in the form of such a fine mist, so intimately associated with the gases as to render separation of this final portion of the liquid apparently impossible. While for many purposes, some residual liquid may be tolerated in the outlet gas, for others it is essential that the separation be complete, even to the extent of virtually trace quantities.

The general object of the present invention is to provide a separator which is capable of removing entrained liquids from gases to that degree of completeness as to reach virtually 100% removal. Tests have shown that a separator embodying the invention can remove in excess of 99.999% of the entrained liquid in a gas, and to do so at large gas throughput rates with assured continuance of performance over long periods of time.

Because of the mass and larger particle size of most of the entrained liquid, it is not difficult to separate out the bulk of the liquid, even to the extent of over 99% removal. However, the last remaining liquid is most difficult to separate, primarily because it is entrained in the form of particles so small and consequently of such little mass, that they tend to remain in the gas stream however the latter may be directed according to customary expedients. The present invention accordingly has been developed in recognition of the fine mist form of the final liquid concentrations approaching trace quantities, and with the object of subjecting the mist particles to conditions of impact, agglomeration and final entrapment as will compensate, from a standpoint of separation forces and effect, for their small mass and low concentration.

The invention is predicated upon the general concept of first removing from the gas the bulk of its liquid entrainment existing in larger particle size, and then subjecting the gas to a path and condition of flow such as to produce deflective impact of the gas and mist particles against surfaces or medium so formed as to retain and isolate immediately the impinged liquid from the gas stream. Preferably, the bulk of the liquid separation is effected first by centrifugal throw-out and retention of all the larger particles, so that the second and more critical (from the standpoint of completeness) separation stage receives the liquid as an almost invisibly fine mist.

Final separation of the liquid is attained by directing the gases through a series of unique impact chambers, in which the gases are impacted or impinged repeatedly in each chamber against means acting to agglomerate the fine mist particles into larger drops or masses, and then so isolate the liquid that it will separate out by gravity. Preferably, in each chamber the gases and liquid are impacted against a screen lining which extends vertically in proximate relation to the wall of the impact chambers, and in each chamber there is provided in succession of surfaces, as by suitable baffles or turbulence plates, for deflecting the gases against the screens all in a manner such that in a single pass of the gas stream through the chamber, its liquid particles are rapidly and repeatedly impinged against the screen surface.

While capable of various arrangements, the impact chambers preferably extend vertically within a common upstanding shell, and may be arranged as a circular series of such chambers. The gases are desirably directed alternately upwardly and downwardly as they pass serially through the successive chambers, and may ultimately flow into a central discharge chamber from which they pass to an outlet. The separated liquid passing through the chamber screens gravitates to the bottom of the shell, typically through a number of vertically extending liquid seal tubes, for collection in a common body.

Prior to delivery of the gases to the impact chambers, the gases may flow through a centrifugal separating passage, in which the bulk of the relatively easily removed liquid is separated from the gases. The impact chambers are then utilized only for removing the final extremely finely divided mist particles which prior devices have been incapable of separating. The centrifugal passage may be contained within the same shell as the impact chambers, and for maximum compactness and fluid handling efficiency the centrifugal passage may extend essentially annularly about the outside of the impact chambers. In order that the space within the shell may be utilized to maximum advantage, the impact chambers may take the form of segments of a common cylinder. The separation of liquid within the centrifugal passage may be enhanced by providing, adjacent the side walls of that chamber, one or more screens similar to the screens in the impact chambers for facilitating the liquid removal.

The above and other features and objects of the present invention will be better understood from the following detailed description of the typical embodiments illustrated in the accompanying drawing, in which:

Fig. 5 is a vertical section similar to Fig. 1, but showing a variational form of separator embodying the invention;

Fig. 6 is a horizontal section taken on line 6—6 of Fig. 5;

Fig. 7 is a fragmentary perspective view, partially broken away, of the Fig. 5 device;

Fig. 8 is a fragmentary view showing one of the sets of baffles of the Fig. 5 device; and Fig. 9 is a horizontal section taken on line 9—9 of Fig. 5.

Figure 1:
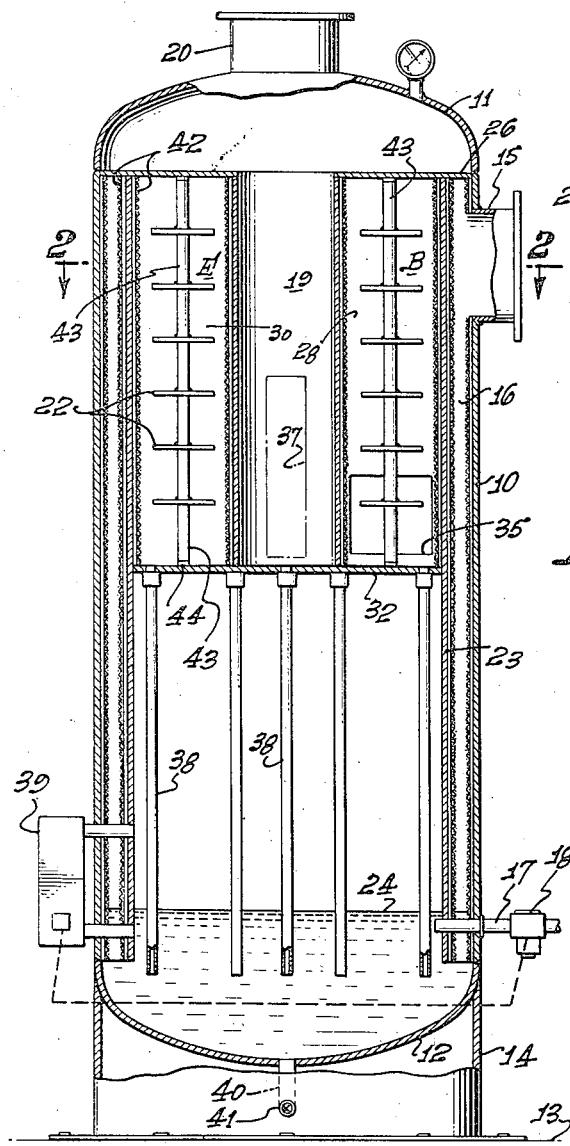
Fig. 1 is a vertical section through an impact type liquid-gas separator constructed in accordance with the invention.
Figure 2:
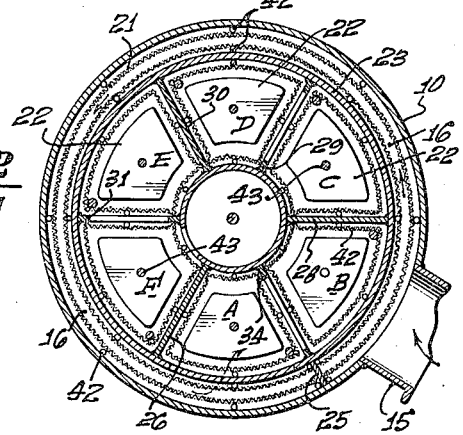
Fig. 2 is a horizontal section taken on line 2—2 of Fig. 1.
Figure 4:
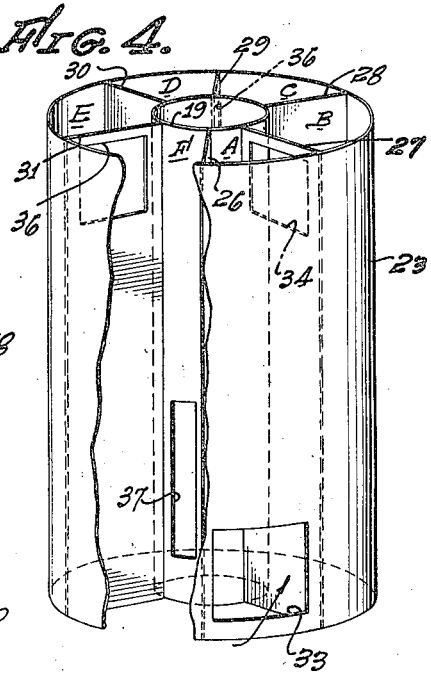
Figure 4 is a semi-schematic fragmentary perspective view, partially broken away, showing the arrangement of the walls which form the impact chambers.
Figure 3:
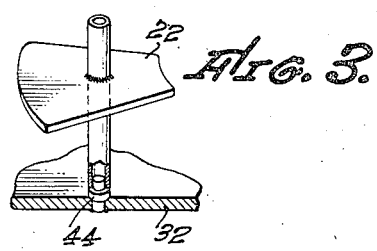
Fig. 3 is a fragmentary perspective view, partially broken away, of the lower portion of one of the baffle or turbulence plate assemblies.

Referring first to Fig. 1, the illustrated device includes an outer vertically extending cylindrical shell 10, having dome shaped top and bottom walls 11 and 12, and suitably stopped on a floor 13 by means of a base structure 14. Gases containing entrained liquid are introduced into the shell through an inlet 15 in the upper portion of shell side wall 10, and flow first through an outer annular centrifugal separating passage 16, and then sequentially through a circular series of inner impact chambers A, B, C, D, E and F. The bulk of the entrained liquid is removed within centrifugal pass 16 and the final extremely finely divided portion of the liquid or mist is substantially completely separated from the gases within the inner impact chambers A to F. All of the separated liquid, typically oil, falls downwardly to the lower portion of shell 10, and is discharged through a liquid outlet line 17 under the control of a valve 18. The cleaned gases flow from the final impact chamber F into an inner vertically extending outlet tube 19, from which they pass upwardly for discharge from the shell through a top outlet 20. The virtually complete separation of the entrained liquid from the gases is attained in large part by the provision within the various separating chambers of screening 21 and several series of turbulence or baffle plates 22 within the impact chambers. The functioning of these screens and baffle plates will be discussed in greater detail at a later point.

The outer annular space 16 is formed by providing a vertically extending cylindrical wall 23 within the shell, this wall 23 being concentric with and spaced inwardly from the cylindrical side wall of the shell to define space 16 between the shell wall and wall 23. Wall 23 preferably extends downwardly as far as the cylindrical side wall of the shell, with the lower end of the space 16 being open to allow liquid to flow downwardly from space 16 into the accumulated body of liquid 24 at the bottom of the shell. Adjacent one side of inlet 15, there is a vertically and radially extending partition 25, which extends the entire distance from an upper wall 26 to the lowermost end of inner wall 23, so that all of the gases from inlet 15 are required to flow circularly within passage 16 through approximately 360° before entering the first impact chamber A, the wall 25 being positioned to prevent flow of the inlet gases along a shorter path in an opposite circular direction to chamber A.

The various impact chambers A, B, C, D, E and F are formed within the interior of wall 23 by means of the inner tube 19 and a series of partitions 26, 27, 28, 29, 30 and 31. Tube 19 is preferably cylindrical, vertical and concentric with the side wall of shell 10 and wall 23. Partitions 26 through 31 extend vertically and preferably radially between tubes 19 and wall 23, to divide the space within wall 23 into the impact chambers A to F, taking the form essentially of a circular series of vertically extending segments of a common cylinder. The annular horizontal top wall 26 extends across and closes the upper ends of outer annular space 16 and all of the impact chambers A to F. A circular bottom wall 32 extends horizontally across and closes the lower ends of impact chambers A to F and the discharge chamber within tube 19.

From the end portion of centrifugal pass 16, the gases flow into a lower portion of the first impact chamber A through an opening 33 formed in wall 23. The gases then flow upwardly through chamber A and then laterally through an opening 34 in the upper portion of partition 27 into chamber B. The gases next flow downwardly through chamber B to an opening 35 in the lower portion of partition 28, through which opening the gases then flow horizontally into a lower portion of chamber C. The partitions 29 and 31 have apertures 36 at their upper ends similar to aperture 34 of partition 27, and partition 30 has an aperture at its lower end similar to aperture 35 of partition 28, so that the gases flow alternately upwardly and then downwardly in successive impact chambers as they flow from chamber A to chamber F. More specifically, the gases flow upwardly in chamber C, then downwardly in chamber D and then upwardly in chamber E, and finally downwardly in chamber F. Partition 26 is imperforate to close off all direct communication between chambers A and F past that partition. The gases in chamber F flow through a vertically elongated aperture 37 in tube 19 to enter the interior of the tube for passage upwardly therethrough toward outlet 20.

Liquid separated from the gases in impacted chambers A to F falls downwardly to the lower portions of those impact chambers and then passes downwardly through vertically elongated tubes 38 connected into the corner portions of the impact chambers respectively. Each of the impact chambers has one of these liquid drain tubes, with a similar tube 38 being connected into the central discharge passage within tube 19. Tubes 38 extend downwardly to the lower portion of shell 10 and to locations beneath the level at which the body of accumulated liquid 12 is maintained, to thus form liquid seals at the bottoms of tubes 38. Valve 18 is suitably controlled to maintain a proper liquid level above the lower ends of tubes 38 and the lower end of wall 23, and for this purpose may comprise a solenoid actuated valve controlled by a liquid level responsive float controlled unit 39 connected into the side of the shell. Sludge accumulated within the bottom of the shell may be periodically withdrawn through a bottom discharge line 40 under the control of valve 41.

The previously mentioned screens 21 extend vertically along and in closely spaced relation to all of the vertical walls of centrifugal passage 16 and the inner impact chambers A to F. These screens may, for example, be spaced about 3/16 of an inch from the adjacent walls, and are preferably formed of wire screen made of a material adapted to resist attack in any manner by the fluids being handled. For most uses a stainless steel wire screen is desirable, say of about 19 mesh. The screen may be mounted in this closely spaced relation to the passage walls by means of a number of vertically extending elongated rods 42, which may be welded to the shell walls and to the screens.

Within each of the impact chambers A to F there is provided an assembly of baffle or deflector plates 22 which act to deflect the gases laterally against the screen in the impact chambers. These baffle plates 22 in each chamber may extend horizontally and be carried in vertically spaced positions by means of a central vertical mounting tube 43. The upper and lower ends of the various baffle mounting tubes 43 may be rigidly attached to top and bottom walls 26 and 32 respectively, as for instance by means of a pair of plug-like connector elements 44. Horizontal plates 22 may all have the same configuration corresponding essentially to, but smaller than, the horizontal cross-sectional configuration of the impact chambers themselves. The baffle plates 22 are preferably positioned centrally within the impact chambers, in spaced relation to the screens lining the chambers, with the turbulence plates desirably occupying about 1/3 of the horizontal cross-sectional area of each impact chamber inside the screen wire lining.

To describe now the operation of the illustrated separator structure. As the gases flow circularly within passage 16 from inlet 15 to impact chamber A, the gases travel sufficiently rapidly to centrifugally separate out the bulk of the oil or other entrained liquid. Most of this separated liquid collects on the inner side wall of shell 10 and falls downwardly along that wall to the bottom of the shell. Screen 21 facilitates this separation of liquid from the gases and provides between the screen and shell wall a relatively quiescent area within which the separated liquid is protected against reentrainment of the gas flow as the liquid falls downwardly along the wall. Also, rods 42 act as dams for preventing circular advancement of the separated liquid along the walls of passage 16 in the direction of gas flow, to thus assure that the separated liquid will fall downwardly to the bottom of the shell.

When the gases flow into the first impact chamber A through aperture 33, the horizontal component of the gas movement causes some of the gas to impact directly against the screen which extends vertically along partition 27, and that impaction against the screen and against the partition has the effect of causing the very minute mist particles still retained in the gases to agglomerate and be separated out onto the screen and wall. As the gases flow upwardly within impact chamber A they are deflected laterally toward screens 21 in the chamber by turbulence plates 22, to thus cause further impaction of the gases against the screens, and thereby effect additional agglomeration and separation of the mist particles. When the gases flow laterally through aperture 34 into the upper portion of chamber B, the initial direction of flow causes a first impaction of the gases in that chamber against the screen extending along partition 28, and as the gases then flow downwardly within chamber B, the turbulence plates in that chamber cause further impactions of the gases against the screens at all sides of chamber B, in the same manner as the turbulence plates of chamber A. This process of course continues as the gases flow through all of the impact chambers A to F with the gases being substantially entirely free of all liquid entrained by the time they enter discharge chamber 19 for upward flow to outlet 20. The separation of entrained liquid from gas by this apparatus is in excess of 99.999%.

Figs. 5 to 8 illustrate a second form of separator constructed in accordance with the invention, which separator is essentially the same as the Figs. 1 to 4 device except with respect to the particular structural differences specifically discussed below. The separator of Figs. 5 to 8 includes an outer shell 45, into a lower portion of which the gas and entrained liquid are introduced through an inlet 46. The cleaned gas leaves the upper end of shell 45 through an upper central outlet 47, and the separated liquid leaves the shell through a discharge line 48, under the control of a valve 49 which is automatically operated by liquid level responsive unit 50 to maintain the liquid level within the shell at substantially a predetermined height 51. Sludge may be periodically removed from the shell through a bottom outlet 52, controlled by a valve 53.

At a location spaced above liquid level 51, shell 45 contains a horizontal partition 54, from which there projects downwardly a cylindrical wall 154. This wall 154 is concentric with and spaced inwardly from the shell side wall 45, and terminates at 155 beneath liquid level 51. Inlet 46 introduces the gas and entrained liquid into the essentially annular chamber 55 formed between walls 45 and 145, and beneath partition 54 and above liquid level 51, so that the gases and liquid flow circularly within that lower chamber and along the sidewall of the shell in a manner centrifugally separating a large part of the liquid from the gases. This circular motion of the gases within lower chamber 55 continues through almost a complete turn, before the partially cleaned gases are allowed to enter the later to be described upper impact chambers through an opening 56 in a first of those chambers. Screens 57 extend vertically along and in closely spaced relation to the vertically extending side walls 45 and 154 of chamber 55, and may be mounted to this wall by a series of vertically extending mounting rods 58. Preferably, screens 57 extend along the entire vertical and circular extents of chamber 55. These screens 57 and rods 58, as well as the other screens and mounting rods which will be described later in discussing the Figs. 5 to 8 form of the invention, may have the same structural characteristics as the various screens and rods utilized in the first form of the invention.

Extending upwardly from and above a central portion of horizontal partition 54, there is a vertical central tube 59, which is preferably concentric with the vertically extending cylindrical side wall of shell 45. The annular space between the shell side wall and tube 59 is divided into a number of equal sized vertically extending segments of a cylinder by means of a series of vertically extending equally spaced radial partitions 60, 61, 62, 63, 64 and 65.

Within the vertical spaces formed between the various radial partitions 60 to 65, there are provided several, typically six, preferably parallel and vertical cylindrical tubes or impact chambers 66 to 71. The first of these vertical tubes or impact chambers 66 extends downwardly through a circular opening in partition 54, to a lower end which is beneath the liquid level 51, and may be closed by a horizontal bottom wall 72. At a location beneath the partition 54, the side wall of tube 66 contains the previously mentioned aperture 56, through which the partially cleaned gases may flow from the bottom centrifugal pass 55 into the first of the impact chambers.

Preferably, aperture 56 is vertically elongated as shown, and is at a side of tube 66 facing essentially away from the gas inlet 46, to require circular flow of the gases within chamber 55 through almost a complete 360° turn. Tube 66 extends entirely across chamber 55 from wall 45 to wall 154, to act as a partition preventing flow of any of the gases directly from the inlet to aperture 56 without first flowing about the centrifugal pass. Tube 66 may terminate upwardly at a horizontal partition 73, which contains circular openings receiving the various tubes 59 and 66 to 71. At a location spaced above partition 73, the annular space between the shell side wall and tube 59 is closed by a horizontal annular partition 74. The previously mentioned radial partitions 60 through 65 may each be formed of two vertically alined sections above and beneath intermediate partition 73.

The gases that enter the lower end of tube 66 flow upwardly through that tube and into the space which is above tube 66 and between partitions 64 and 65. From this space, the gases flow laterally through registering apertures 75 in partition 65 and the upper portion of an adjacent tube 67, to then flow downwardly through that second tube or impact chamber. The lower end of tube 67 terminates at a location 167 space above wall 54. The gases flow downwardly from tube 67 to the space therebeneath, and then flow laterally through registering apertures 76 in partition 60, and the lower portion of tube 68, to thus enter tube 68 at its lower end for travel upwardly through that tube. The lower end of tube 68 is connected to wall 54, and the upper end of tube 68 terminates at partition 73 in the same manner as the first tube or impact chamber 67. From the space above the upper end of tube 68, the gases flow laterally through registering apertures 77 in partition 61 and the upper portion of tube 69, to enter the upper portion of tube 69 and flow downwardly therethrough. At the lower end of tube 69 (which is identical with tube 67), the gases flow alterally into the lower portion of tube 70 through apertures 78 in partition 62 and the lower portion of tube 70. Tube 70 is constructed the same as tube 68, terminating at partition 73, and after the gases have flown upwardly through tube 70 they flow laterally through registering apertures 79 in partition 63 and tube 71, to flow downwardly through tube 71 (which is the same as tubes 67 and 69) for discharge radially inwardly from its lower portion and into central tube 59 through an aperture 80 in tube 59. The gases then flow upwardly through central tube 59 for discharge from the shell through outlet 47.

At the location of each of the sets of apertures 75, 76, 77, 78 and 79, through which the gases flow from one of the vertical chambers to another, the gas passages between the successive chambers may be defined or closed about their peripheries by short tubular pieces of metal or walls 81 (see Fig. 6) extending from the partitions 60—65 to the associated tubes 66 to 71.

Each of the vertically extending impact chambers 66 to 71 contains a series of vertically spaced inclined baffles 82, mounted on and rigidly carried by a vertical rod 83. In the case of chamber 66, this rod 83 extends from a web structure 72 of open fluid passing construction to top wall 74. In the case of the other chambers 67 to 71, the rod 83 extends from partition 54 to top wall 74.

Vertically successive baffles 82 within each of the chambers 66 to 71 may be inclined oppositely, that is, the lower baffle in each chamber may be inclined in a first direction, with the next upper baffle in that chamber being inclined in a generally opposite direction, and the top baffle in the same chamber being inclined in essentially the same direction as the lower baffle (where three baffles are provided). Desirably, each of the baffles 82 which is located laterally opposite one of the sets of apertures 75 to 80 is inclined in a direction such that one face of the baffle is directed generally toward the adjacent apertures. Each of the baffles 82 is preferably of an ellipsoidal configuration, such that the baffles when seen in plan view appear to be substantially circular (see Fig. 6). Each of the baffles which is located within one of the tubes 66 to 71 preferably extends across approximately 25 per cent of the horizontal cross sectional area of the tube. The three baffles which are located in the somewhat enlarged spaces above the upper ends of tubes 66, 68 and 70 may be somewhat larger than the rest of the baffles, as seen best in Fig. 5, to occupy approximately 25 percent of the horizontal areas of the spaces within which they are received.

Within each of the tubes or impact chambers 66 to 71, and within central tube 59, there are provided vertically extending screens 85, which extend in closely spaced relation to the side walls of the tubes, and extend along substantially the entire areas of those side walls. These screens 85 may be mounted in the desired closely spaced relation to the tube walls by means of spaced parallel vertically extending mounting rods 86 between the screens and tube walls (and which are welded or otherwise secured to both the screens and tube walls). On the baffles 82 which are located in and above the chambers 66, 68 and 70, i. e. the chambers within which the gases flow upwardly, there are provided across the entire bottom sides of the various baffles 82, a number of screens 87 which may be formed of the same type of screen utilized for the other screens in both forms of the invention. These screens 87 may be secured in any suitable manner to the undersides of the baffles, to facilitate the separation of liquid from the gases when the gases impact upwardly against the screens and baffles. In the chambers 67, 69 and 71, within which the gases flow downwardly, screens 88 are provided across the upper sides of the baffles 82, to be contacted by the down-flowing gases. The liquid separated from the gases within each of the various chambers 59 and 66 to 71 is drained downwardly to the bottom of the shell through a number of vertically extending drain lines 89, which project downwardly from the bottoms of the various impact chambers to locations beneath the liquid level 51 at the bottom of the chamber.

When the device of Figs. 5 to 8 is in use, the gases from inlet 46 first flow circularly within bottom chamber 55 to centrifugally separate out a large part of the entrained liquid, which then collects on the side wall of the shell and falls downwardly between the shell and screen 57 into the bottom liquid collecting portion of the shell. The gases which have thus been partially cleaned enter into the first impact chamber through aperture 56, and then flow upwardly through chamber 66, downwardly through chamber 67, upwardly through chamber 68, downwardly through chamber 69, upwardly through chamber 70, downwardly through chamber 71, and upwardly through inner tube 59 to discharge from the shell through outlet 45. As the gases flow through the various impact chambers, the entrained liquid is impacted against the screen carrying surfaces of the various baffles 82, to thus cause a separation of some of the liquid from the gases, and also the oppositely inclined relation of successive baffles causes the gases to follow a rather circuitous path through the impact chambers (as indicated by the arrows in Fig. 7), so that the gases are at numerous points impacted against the screen side walls of the impact chambers, to thus separate out additional liquid. The overall result is a very complete separation of substantially all of the liquid from the gases before they are permitted to leave the separator through outlet 47.

I claim:

1. A separator comprising means forming an upstanding shell having a centrifugal separating passage therein, an inlet for introducing a flow of gas containing entrained liquid into said passage for flow therethrough to centrifugally separate the bulk of said liquid from the gas, wall means forming a series of vertically extending impact chambers in said shell through which the gases flow after passing through said centrifugal passage and confining the gases for series flow through the chambers and alternately in opposite vertical directions as the gases flow through successive chambers respectively, there being passages placing said successive chambers in communication at locations causing said flow alternately in opposite vertical directions, said wall means including essentially vertical side walls of the chambers, screens extending essentially vertically in close proximity to said side walls of the chambers, baffles in said chambers disposed across the path of vertical gas flow and against which the gases impact and acting to deflect said gases laterally against said screens and side walls to agglomerate and remove from the gases fine mist which is not separated centrifugally in said passage, an outlet for discharging the cleaned gas from the shell after passage through said chambers, and means for discharging the separated liquid from a lower portion of the shell separately from the gas.

2. A separator as recited in claim 1, in which said first mentioned means form a vertically extending essentially circularly curving side wall of said centrifugal passage, there being screening in said centrifugal passage extending essentially vertically in closely proximate relation to said side wall thereof.

3. A separator as recited in claim 1, in which said centrifugal passage extends essentially circularly about said impact chambers.

4. A separator as recited in claim 1, in which said centrifugal passage extends essentially circularly within the shell beneath said impact chambers.

5. A separator as recited in claim 1, in which said chambers comprise a circular series of vertically extending chambers, there being a gas discharge chamber inwardly of said circular series of impact chambers and through which gases flow from a final impact chamber to said outlet.

6. A separator as recited in claim 1, in which there are a plurality of seal tubes projecting downwardly from said impact chambers to a location beneath the surface of a body of liquid maintained in said lower portion of the shell to deliver the separated liquid thereto.

7. A separator as recited in claim 1, in which said baffles include a series of vertically spaced baffles in each of said chambers and spaced from side walls of the chamber to pass the gases vertically past the baffles.

8. A separator as recited in claim 1, in which said baffles include a series of vertically spaced baffles in each of said chambers and spaced from side walls of the chamber to pass the gases vertically past the baffles, successive ones of said baffles being inclined oppositely.

9. A separator as recited in claim 1, in which said baffles include a series of vertically spaced baffles in each of said chambers and spaced from side walls of the chamber to pass the gases vertically past the baffles, and screening on said baffles in closely spaced relation to the gas contacting surfaces thereof.

10. A separator as recited in claim 1, in which said first mentioned means include two vertically extending radially spaced inner and outer walls curving essentially circularly and defining said centrifugal passage, there being screens extending vertically in closely spaced relation to both of said inner and outer walls.

11. A separator as recited in claim 10, in which said baffles include a series of vertically spaced baffles in each of said chambers and spaced from side walls of the chamber to pass the gases vertically past the baffles, successive ones of said baffles being inclined oppositely, and screening on said baffles in closely spaced relation to the gas contacting surfaces thereof.

12. A separator as recited in claim 1, in which said first mentioned means comprise walls defining said centrifugal passage in the shell beneath said chambers with the lower end of the passage in communication with a body of liquid in the bottom of the shell, there being a plurality of seal tubes projecting downwardly from said chambers to a location beneath said body of liquid.

13. A separator as recited in claim 12, in which said walls defining the centrifugal passage include vertically extending side walls of the passage, there being screens extending along said side walls of the passage in closely spaced relation thereto, said baffles including a series of vertically spaced baffles in each chamber and spaced from sides thereof.

14. A separator as recited in claim 13, in which said chambers comprise a circular series of vertically extending chambers, there being a gas discharge chamber inwardly of said circular series of impact chambers and through which gases flow from a final impact chamber to said outlet, successive ones of said baffles being inclined oppositely, and screening on said baffles in closely spaced relation to the gas contacting surfaces thereof.

15. A separator comprising means forming an upstanding shell having a centrifugal separating passage extending circularly within an outer portion thereof, an inlet for introducing a flow of liquid carrying gas into said passage for essentially circular flow therealong to separate entrained liquid therefrom, means forming a circular series of vertically extending impact chambers in said shell inwardly of said outer centrifugal passage and through which the gas is directed after flowing through said centrifugal passage, an outlet for discharging the gas from the shell after passage through said chambers, said chambers having vertically extending walls, screens in said chambers extending vertically along said chamber walls in closely spaced relation thereto to facilitate separation of entrained liquid, a series of vertically spaced essentially horizontal baffles in each of said chambers deflecting said gases laterally against said screens, there being apertures placing successive chambers in communication and requiring said gases to flow alternately upwardly and downwardly through successive chambers, a gas discharge chamber inwardly of said circular series of impact chambers and through which gases flow from a final impact chamber to said outlet, and means for discharging said separated liquid from a lower portion of the shell separately from the gas, said liquid discharging means comprising a plurality of seal tubes projecting downwardly from said impact chambers and said gas discharge chamber to a location beneath the surface of a body of liquid maintained in the lower portion of the shell.

16. A separator comprising wall means forming a series of vertically extending impact chambers in said shell through which the gases flow and confining the gases for series flow through the chambers and alternately in opposite vertical directions as the gases flow through successive chambers respectively, there being passages placing said sucessive chambers in communication at locations causing said flow alternately in opposite vertical directions, said wall means including essentially vertical side walls of the chambers, screens extending essentially vertically in close proximity to said side walls of the chambers, baffles in said chambers disposed across the path of vertical gas flow and against which the gases impact and acting to deflect said gases laterally against said screens and side walls to agglomerate entrained liquid and remove it from the gases, an inlet for introducing the gases into a first of said chambers, an outlet for discharging the cleaned gases from the shell after passage through the chambers, and means for discharging the separated liquid from a lower portion of the shell separately from the gas.

17. A separator as recited in claim 16, in which said spaced baffles in each chamber are spaced from the side walls of the chamber and are carried by a common vertically extending rod.

18. A separator as recited in claim 16, including screens on said baffles in close proximity to the gas deflecting surfaces thereof.

19. A separator as recited in claim 16, in which said chambers comprise a circular series of vertically extending chambers, there being a gas discharge chamber inwardly of said circular series of impact chambers and through which gases flow from a final impact chamber to said outlet.

20. A separator as recited in claim 19, in which said spaced baffles in each chamber are spaced from the side walls of the chamber and are carried by a common vertically extending rod, successive ones of said baffles being inclined in opposite directions, and there being screens on said baffles in close proximity to the gas deflecting surfaces thereof.

References Cited in the file of this patent

UNITED STATES PATENTS

| 1,926,262 | Campbell | Sept. 12, 1933 |
| 2,010,456 | Jones | Aug. 6, 1935 |
| 2,511,967 | Campbell | June 20, 1950 |

FOREIGN PATENTS

| 55,753 | France | May 21, 1952 |
| | Addition to No. 891,643 | |
| 574,844 | Germany | Apr. 21, 1933 |